United States Patent [19]

Matsuura et al.

[11] Patent Number: 4,812,169

[45] Date of Patent: * Mar. 14, 1989

[54] PROCESS FOR PRODUCING A FIRE-RESISTANT, LIGHT-WEIGHT CONSTRUCTION MATERIAL

[75] Inventors: Sadaji Matsuura, Numazu; Yasuo Arai, Kunitachi; Shigeki Aoki, Tokyo; Satoru Ando, Fuji, all of Japan

[73] Assignee: Fuji Fire-Proof Material Industry Co., Ltd., Shizuoka, Japan

[*] Notice: The portion of the term of this patent subsequent to May 6, 2003 has been disclaimed.

[21] Appl. No.: 60,939

[22] Filed: Jun. 9, 1987

Related U.S. Application Data

[63] Continuation of Ser. No. 773,535, Sep. 9, 1985, abandoned, which is a continuation of Ser. No. 574,261, Jan. 26, 1984, Pat. No. 4,586,958.

[30] Foreign Application Priority Data

Jan. 26, 1983 [JP] Japan .................................. 58-11058

Jan. 26, 1983 [JP] Japan .................................. 58-11059

[51] Int. Cl.$^4$ ................................................ C09D 5/14
[52] U.S. Cl. .............................. 106/15.05; 106/18.12; 106/97; 252/62
[58] Field of Search ............ 106/DIG. 1, 9, 97, 15.05; 252/62

[56] References Cited

U.S. PATENT DOCUMENTS 2,698,251 12/1954 Shea ........................................ 106/98
4,375,986 3/1983 Pichat ..................................... 106/85
4,586,958 5/1986 Matsuura ........................... 106/18.12

Primary Examiner—Theodore Morris
Attorney, Agent, or Firm—Birch, Stewart, Kolasch & Birch

[57] ABSTRACT

A fire-resistant, light weight construction material is prepared by subjecting fly ash and/or paper sludge incineration ash to a swelling treatment with a mineral acid to prepare a slurry; and kneading, shaping and hardening the slurry.

17 Claims, No Drawings

PROCESS FOR PRODUCING A FIRE-RESISTANT, LIGHT-WEIGHT CONSTRUCTION MATERIAL

This application is a continuation of application Ser. No. 773,535 filed on Sept. 9, 1985, now abandoned which is a continuation of application Ser. No. 574,261 now U.S. Pat. No. 4,586,958 filed Jan. 26, 1984.

BACKGROUND OF THE INVENTION

This invention relates to a process for producing a fire-resistant, light-weight construction material.

Fly ash has been effectively utilized as a cement additive or the like. However at present, from 12 to 13 million tons of fly ash by-product is produced annually and therefore its more effective utilization has been desired.

On the other hand, paper sludge incineration ash has a composition similar to that of fly ash. From 30 to 40 thousand tons of paper sludge incineration ash is by-product is produced annually, but the greater amount thereof has been discarded without utilization and it has become more difficult to find a place where it can be discarded.

SUMMARY OF THE INVENTION

An object of the present invention is to provide a process for producing a fire-resistant, light-weight construction material by using fly ash and/or paper sludge incineration ash mentioned above.

Another object of the present invention is to provide a construction material having a light weight and having excellent fire-resistance and enough strength to be used as a construction material.

A further another object of the present invention is to provide a fire-resistant, light-weight construction material which is particularly suitable for use as an interior wall board and a ceiling board.

As a result of extensive studies to enhance effective utilization of fly ash as a construction material and to make enable effective utilization of paper sludge incineration ash as a construction material, we have found that a hardened material which is light in weight and fire-resistant and can be easily processed can be obtained by adding a mineral acid to fly ash and/or paper sludge incineration ash and agitating the resulting mixture to swell the above mentioned fly ash and/or paper sludge incineration ash. Thereafter a slurry hardener such as cement and the like is added thereto and the entire mixture is kneaded.

The present invention is completely based on the above mentioned finding and provides a process for producing a fire-resistant, light-weight construction material which comprises:
subjecting fly ash and/or paper sludge incineration ash
  to a swelling treatment with a mineral acid to prepare a slurry;
adding to the slurry a slurry hardener and kneading the entire mixture; and
shaping and hardening the kneaded mixture.

DETAILED DESCRIPTION OF THE INVENTION

The embodiments of the present invention are herein described in detail below.

In practicing the present invention, fly ash and/or paper sludge incineration ash is first subjected to a swelling treatment to prepare a slurry having a solid content of 5 to 30%. The swelling treatment is conducted by agitating the fly ash and/or paper sludge incineration ash with a mineral acid and water. The mineral acid may be previously diluted with a certain amount of water.

As the above mentioned mineral acid, there can be used sulfuric acid or hydrochloric acid, preferably diluted sulfuric acid ranging in concentration of from 1 to 5%. The amount thereof is an amount necessary to maintain the pH value of the slurry at about 1.0 to about 8.0, preferably about 6.8 to about 7.2. If the pH value of the slurry is below the above mentioned lowest value, the kneaded mixture prepared by kneading the slurry and the slurry hardener would show a pH value of 9 or below, whereby a hardened material having an insufficient strength would be obtained. If the pH value of the slurry exceeds the above mentioned highest value, a sufficient treatment by the mineral acid can not be acheived because of too small amount of the mineral acid.

If the swelling treatment time is made longer or the swelling treatment temperature is made higher, the bulk density of the objective hardened material (construction material) becomes lower. On the other hand, when the treatment time is made shorter or the treatment temperature is made lower, the bulk density becomes higher. However, in view of the strength of the hardened material, usually the preferable treatment time is about 10 minutes to about 24 hours and the preferable treatment temperature is from the room temperature to about 80° C.

Next, a slurry hardener is added to and kneaded with the slurry prepared by subjecting fly ash and/or paper sludge incineration ash to swelling treatment with a mineral acid.

As the slurry hardener, there can be used cement, slaked lime, quick lime, slag, water glass, caustic soda, gypsum and the like. These slurry hardeners may be used alone but preferably they are used in combination.

The amount of the slurry hardener added is preferable from about 5 to about 40 parts by weight based on 100 parts by weight of the slurry, but it varies depending on the kind of slurry hardeners utilized. An example of a preferable slurry hardener composition is a composition of $30\pm10$ parts by weight of cement, $30\pm10$ parts by weight of slag, and $10\pm5$ parts by weight of slaked lime.

To the kneaded mixture of the slurry with the slurry hardener, there may be added and an inorganic fiber or an organic fiber, whereby the strength of the fire-resistant, light-weight construction material, which is an objective material of the present invention, can be further raised.

As the inorganic fiber, there can be used asbestos, glass fiber, rock wool fiber and the like. As the organic fiber, there can be used pulp, waste paper, nylon, vinylon and the like. The amount of these fibers is preferably from about 20 to about 40 parts by weight per 100 parts by weight of the slurry.

In the present invention, when boards are desired as a shaped body, it is preferable to add the above mentioned inorganic fiber or organic fiber. When blocks such as those for walls or fences are desired, sand, fine gravel and the like may be used in place of the above mentioned fiber.

According to the present invention, a metal chloride may be added to and kneaded with the above-mentioned kneaded mixture. When the metal chloride is added and kneaded, there are realized some advantages such as an accelerated degree of crystallization of calcium silicate hydrated gel. As the metal chloride, there can be used $BaCl_2$, $MnCl_2$, KCl and the like. The amount of the metal chloride added is from 0.1 to 5.0% by weight based on the total solid content of the above mentioned kneaded mixture.

In the present invention, when paper sludge incineration ash is used, it is preferable to add a siliceous mineral to the above mentioned kneaded mixture. The amount of the siliceous mineral added is from about 2 to 10% by weight based on the total solid content of the above mentioned kneaded mixture.

As mentioned above, to the slurry there are subsequently added the above mentioned slurry hardener and the optional other additives, and the resulting mixture is then kneaded to form a kneaded mixture, which is thereafter shaped into a desired form having a desired size such as board, block or the like.

As the shaping apparatus, there can be used a paper making machine, a filtration-compression molding machine or extrusion molding machine as well as those machines using a molding box into which the kneaded mixture is poured.

When a foam product is desired as a final product, the above mentioned kneaded mixture is foamed by adding a blowing agent such as aluminium powders and the like to the said kneaded mixture, and then the foaming mixture is poured into a molding box to shape it into a desired form having a desired size such as a board, a block or the like.

When the blowing agent such as the aluminium powder is added, the blowing agent reacts with the slurry hardener, whereby hydrogen gas is generated, and as the result, a, the foaming mixture is obtained. The amount of the aluminium powder added is from about 0.1 to about 0.5% by weight based on the total solid content of the above mentioned kneaded mixture. Besides the aluminium powder, usual surfactants can be added as a blowing agent. The amount of the surfactant added is from about 0.05 to about 0.2% by weight based on the total solid content of the above mentioned kneaded mixture. The surfactant not only generates gas foam, but also stabilizes foam and regulates the size of the foam.

The shaped body and the foam shaped body obtained by the above mentioned shaping method is then hardened by natural curing (aging) or by low or high pressure vapor curing to obtain the hardened body which is fire-resistant, and a light-weight construction material.

The low or high vapor pressure curing is suitably conducted at a vapor pressure of 1 to 5 kg/cm and a temperature of 60° to 140° C. for about 8 to about 15 hours.

The reaction mechanism of the swelling treatment in the process of the present invention for producing a fire-resistant, light-weight construction material is explained below by taking as an example the swelling treatment of fly ash with sulfuric acid. By agitating and mixing fly ash and sulfuric acid, $SiO_2$ which is a component of fly ash is activated. Further CaO which is contained in fly ash is converted to $CaSO_4$ and $Al_2O_3$ which is also contained in fly ash is converted to $Al_2(SO_4)_3$ a part of which is further converted to $Al(OH)_3$ to form a fly ash slurry. When the slurry hardener is added to and kneaded with the the resulting slurry, the reaction further proceeds whereby calcium sulfonate hydrate and calcium aluminate hydrate are produced. Further calcium silicate hydrate is produced from the activated $SiO_2$. It is understood that the hardened body is produced by the reactions mentioned above.

The construction material of the present invention may be embossed at its curing time in a conventional manner. This embossing can be conducted even after aging (curing) the shaped body for a several days, because according to the present invention a content of cement used is maintained low.

As mentioned above, according to the process of the present invention, fly ash or paper sludge incineration ash are/is used after being subjected to a swelling treatment with a mineral acid. By a swelling-treatment of fly ash with a mineral acid, a construction material can be produced which can further increase effective utilization of fly ash. Further a by swelling-treatment of paper sludge incineration ash with a mineral acid, it becomes possible to use as a construction raw material paper sludge incineration ash a greater portion of which has been discarded without utilization. Furthermore, the construction material prepared by the process of the present invention having a light weight and has excellent fire-resistance. In addition, it can be easily embossed even after aging (curing) the shaped body for a several days. Accordingly, these features coupled with a wide range of utilization as a construction material, the product of the present invention, has a large impact on increasing the effective use of the previously discarded materials.

Examples of the present invention will be shown below.

EXAMPLE 1

To 50 parts by weight of fly ash, there was added 500 parts by weight of diluted sulfuric acid (concentration 1.0%) and the resulting mixture was agitated for about 1 hour. To the slurry obtained, there was added 16 parts by weight of cement, 14 parts by weight of slag, 4 parts by weight of slaked lime, 12 parts by weight of asbestos and 4 parts by weight of waste paper to prepare an aqueous slurry. Thereafter the aqueous slurry was transferred onto a cylinder paper machine to form a base board of wetted mat, which was then aged (cured) and hardened for 2 to 4 weeks to obtain a fire-resistant, light-weight construction material (final product) of the present invention having a dimension of 910 mm × 1820 mm × 6 mm. The mechanical strength (bending strength) of the final product was 150 Kg/cm (length direction) and 95 kg/cm (width direction). The bulk density was 0.95.

EXAMPLE 2

The procedure of Example 1 was repeated except that simultaneously with the addition of cement and the other materials, 0.5% by weight of $BaCl_2$ was added to the slurry to obtain a final product. The mechanical strength (bending strength) of the final product is 170 Kg/cm (length direction) and 110 Kg/cm (width direction). The bulk density was 0.95.

EXAMPLE 3

To 50 parts by weight of paper sludge incineration ash, there was added 500 parts by weight of diluted sulfuric acid (concentration 1.0%) and the resulting mixture was agitated for about 1 hour. To the slurry obtained, there was added 15 parts by weight of cement, 15 parts by weight of slag, 5 parts by weight of slaked lime, 3 parts by weight of asbestos and 12 parts by weight of waste paper to prepare an aqueous slurry.

Thereafter the aqueous slurry was transferred onto a cylinder paper machine to form a base board of wetted mat, which was then aged (cured) and hardened for 2 to 4 weeks to obtain a fire-resistant, light-weight construction material (final product) of the present invention having a dimension of 910 mm×1820 mm×6 mm. The mechanical strength (bending strength) of the final product was 160 kg/cm (length direction) and 105 Kg/cm (width direction). The bulk density was 0.70.

EXAMPLE 4

The procedure of Example 3 was repeated except that simultaneously with the addition of cement and the other materials, 0.5% by weight of $BaCl_2$ was added to the slurry to obtain a final product. The mechanical strength (bending strength) of the final product is 175 kg/cm (length direction) and 115 Kg/cm (width direction). The bulk density was 0.70.

EXAMPLE 5

To 50 parts by weight of fly ash, there was added 70 parts by weight of diluted sulfuric acid (concentration 4.7%) and the resulting mixture was agitated for about 1 hour. To the slurry obtained, there was added 16 parts by weight of cement, 14 parts by weight of slag, 4 parts by weight of slaked lime, 12 parts by weight of asbestos and 4 parts by weight of waste paper to prepare an aqueous slurry. Thereafter the aqueous slurry was transferred onto a cylinder paper machine to form a base board of wetted mat, which was then aged (cured) and hardened for 2 to 4 weeks to obtain a fire-resistant, light-weight construction material (final product) of 4 parts by weight of slaked lime, 12 parts by weight of the present invention having a dimension of 910 mm×1820 mm×6 mm. The mechanical strength (bending strength) of the final product was almost the same as the mechanical strength (bending strength) of the final product of Example 1. The bulk density was 0.95.

EXAMPLE 6

To 100 parts by weight of fly ash, there was added 1000 parts by weight of diluted sulfuric acid (concentration 1.0%) and the resulting mixture was agitated for about 1 hour. To 660 parts by weight of the slurry obtained, there was added 40 parts by weight of slaked lime, 0.3 parts by weight of aluminium powders and 0.1 parts by weight of surfactant to prepare the foaming mixture. And then the foaming mixture was poured into a molding box to form a base board of wetted mat (a foam shaped body) which was then aged (cured) and hardened for 2 to 4 weeks to obtain a fire-resistant, light-weight construction material (final product) of the present invention having a dimension of 910 mm×1820 mm×6 mm. The mechanical strength (bending strength) of the final product was 14.5 Kg/cm (length direction). The bulk density was 0.5. The percentage shrinkage was 0.04%.

EXAMPLE 7

To 100 parts by weight of paper sludge incineration ash, there was added 1000 parts by weight of diluted sulfuric acid (concentration 1.0%) and the resulting mixture was agitated for about 1 hour. To 572 parts by weight of the slurry obtained, there was added 40 parts by weight of slaked lime, 8 parts by weight of siliceous mineral powders, 0.3 parts by weight of aluminium powders and 0.1 parts by weight of surfactant to prepare the foaming mixture. And then the foaming mixture was poured into a molding box to form a base board of wetted mat (a foam shaped body), which was then aged (cured) and hardened for 2 to 4 weeks to obtain a fire-resistant, light-weight construction material (final product) of the present invention having a dimension of 910 mm×1820 mm×6 mm. The mechanical strength (bending strength) of the final product was 12.7 Kg/cm (length direction). The bulk density was 0.5. The percentage shrinkage was 0.04%.

What is claimed is:

1. A process for producing a fire-resistant, light weight construction material which comprises:

subjecting fly ash to a swelling treatment with a mineral acid to prepare a slurry;

adding to the slurry a slurry hardener to form a mixture and kneading the mixture;

adding to the kneaded mixture about 20 to about 40 parts of a material selected from sand, fine gravel or a mixture thereof per 100 parts by weight of the slurry; and shaping and hardening the sand and/or fine gravel containing kneaded mixture to obtain the fire-resistant, light weight construction material.

2. A process for producing a fire-resistant, light weight construction material according to claim 1, wherein the fly ash is subjected to the amount of the mineral acid necessary to maintain the pH value of the slurry at about 1.0 to about 8.0.

3. A process for producing a fire-resistant, light weight construction material according to claim 2, in which the swelling treatment is conducted by agitating a mixture of the fly ash, the mineral acid and water, wherein the mineral acid is selected from sulfuric acid or hydrochloric acid.

4. A process for producing a fire-resistant, light weight construction material according to claim 3, wherein the mineral acid is a diluted sulfuric acid comprising a concentration of 1 to 5% and wherein the pH value of the slurry is maintained at about 6.8 to about 7.2.

5. A process for producing a fire-resistant, light weight construction material according to claim 1, which further comprises the step of regulating the bulk density of the said material which comprises conducting the swelling treatment for a period of from about 10 minutes to about 24 hours at a temperature of from room temperature to about 80° C.

6. A process for producing a fire-resistant, light weight construction material according to claim 1, wherein the slurry hardener is selected from the group consisting of cement, slaked lime, slag, water glass, caustic soda, gypsum and a mixture thereof.

7. A process for producing a fire-resistant, light weight construction material according to claim 1, wherein 0.1 to 5.0% by weight of a metal chloride is further added to the slurry and slurry hardener mixture, said weight being based on the total solid content of the kneaded mixture.

8. A process for producing a fire-resistant, light weight construction material according to claim 1 wherein a blowing agent is further added to the kneaded mixture and wherein the said process further comprises a curing step, wherein during or after the curing period of said curing step, the obtained fire-resistant, light weight construction material is further being subjected to embossing.

9. A process for producing a fire-resistant, light weight construction board which comprises:

subjecting fly ash to a swelling treatment with a mineral acid to prepare a slurry;

adding to the slurry a slurry hardener to form a mixture and kneading the mixture;

adding to the kneaded mixture about 20 to about 40 parts of a fiber selected from an inorganic fiber, an organic fiber or a mixture thereof per 100 parts by weight of the slurry; and shaping and hardening the inorganic fiber and/or organic fiber containing kneaded mixture to obtain the fire-resistant, light weight construction board.

10. A process for producing a fire-resistant, light weight construction board according to claim 9, wherein the fly ash is subjected to the amount of the mineral acid necessary to maintain the pH value of the slurry at about 1.0 to about 8.0.

11. A process for producing a fire-resistant, light weight construction board according to claim 10, in which the swelling treatment is conducted by agitating a mixture of the fly ash, the mineral acid and water, wherein the mineral acid is selected from sulfuric acid or hydrochloric acid.

12. A process for producing a fire-resistant, light weight construction board according to claim 11, wherein the mineral acid is a diluted sulfuric acid comprising a concentration of 1 to 5% and wherein the pH value of the slurry is maintained at about 6.8 to about 7.2.

13. A process for producing a fire-resistant, light weight construction board according to claim 9, which further comprises the step of regulating the bulk density of the said board which comprises conducting the swelling treatment for a period of from about 10 minutes to about 24 hours at a temperature of from room temperature to about 80° C.

14. A process for producing a fire-resistant, light weight construction board according to claim 9, wherein the slurry hardener is selected from the group consisting of cement, slaked lime, slag, water glass, caustic soda, gypsum and a mixture thereof.

15. A process for producing a fire-resistant, light weight construction board according to claim 9, wherein 0.1 to 5.0% by weight of a metal chloride is further added to the slurry and slurry hardener mixture, said weight being based on the total solid content of the kneaded mixture.

16. A process for producing a fire-resistant, light weight construction board according to claim 9, wherein a blowing agent is further added to the kneaded mixture and wherein the said process further comprises a curing step, wherein during or after the curing period of said curing step, the obtained fire-resistant, light weight construction board is further being subjected to embossing.

17. A process for producing a fire-resistant light weight construction board which comprises:

subjecting fly ash to a swelling treatment with a mineral acid to prepare a slurry;

adding to the slurry a slurry hardener to form a mixture and kneading the mixture;

adding to the kneading mixture about 20 to about 40 parts of a fiber selected from an inorganic fiber, an organic fiber or a mixture thereof per 100 parts weight of the slurry; and shaping and hardening the kneaded mixture to obtain a fire-resistant, light weight construction board having a mechanical strength of 150–170 Kg/cm$^2$ (length direction) and 95–110 Kg/cm$^2$ (width direction).

* * * * *